Aug. 14, 1956  A. M. COMPTON  2,758,849

CLOSE SPACED ARTICULATING TANDEM

Filed July 26, 1955

INVENTOR.
Arthur M. Compton
BY
ATTORNEY.

United States Patent Office 2,758,849
Patented Aug. 14, 1956

2,758,849

CLOSE SPACED ARTICULATING TANDEM

Arthur M. Compton, Bethel, Kans., assignor to Standard Steel Works, Inc., North Kansas City, Mo., a corporation of Texas Application July 26, 1955, Serial No. 524,479

16 Claims. (Cl. 280—104.5)

This invention relates to a new and improved, closely spaced undercarriage or tandem running gear for mobile vehicles such as trucks, trailers and semi-trailers, the primary object being to permit manipulation of extremely short turns within a relatively small radius, while at the same time providing for controlled steering, stabilization and equalization of loads on the relatively articulated wheel and axle assemblies.

Another important object of the instant invention is the provision of an undercarriage of the aforementioned character having a pair of wheel and axle assemblies so interconnected and coupled with the overlying frame which is supported thereby, as to automatically cause the assemblies to turn with respect to the curve during manipulation of turns in either direction so that the axles of the two assemblies diverge as the curve line is approached, thereby virtually eliminating all scuffing of tires.

Another important object of the present invention is the provision of an undercarriage having an articulated tandem arrangement of such nature as to permit relatively close coupling, thereby conserving space and adapting the same for use in relatively confined areas where considerable manipulation is required in order to maneuver the vehicle into desired positions with respect to loading docks and other points of use.

A further object of the present invention is to provide a unique tongue arrangement for undercarriages such as above set forth for the purpose of effecting the steering above mentioned without binding or unnecessary strains upon any part of the vehicle so that all elements of the undercarriage may swing relatively and with respect to the frame and shift vertically with complete freedom.

A still further object of the invention about to be described is to provide spring means for each wheel and axle assembly capable of properly absorbing shocks and making possible the attainment of all of the aforementioned objects.

Figure 1:
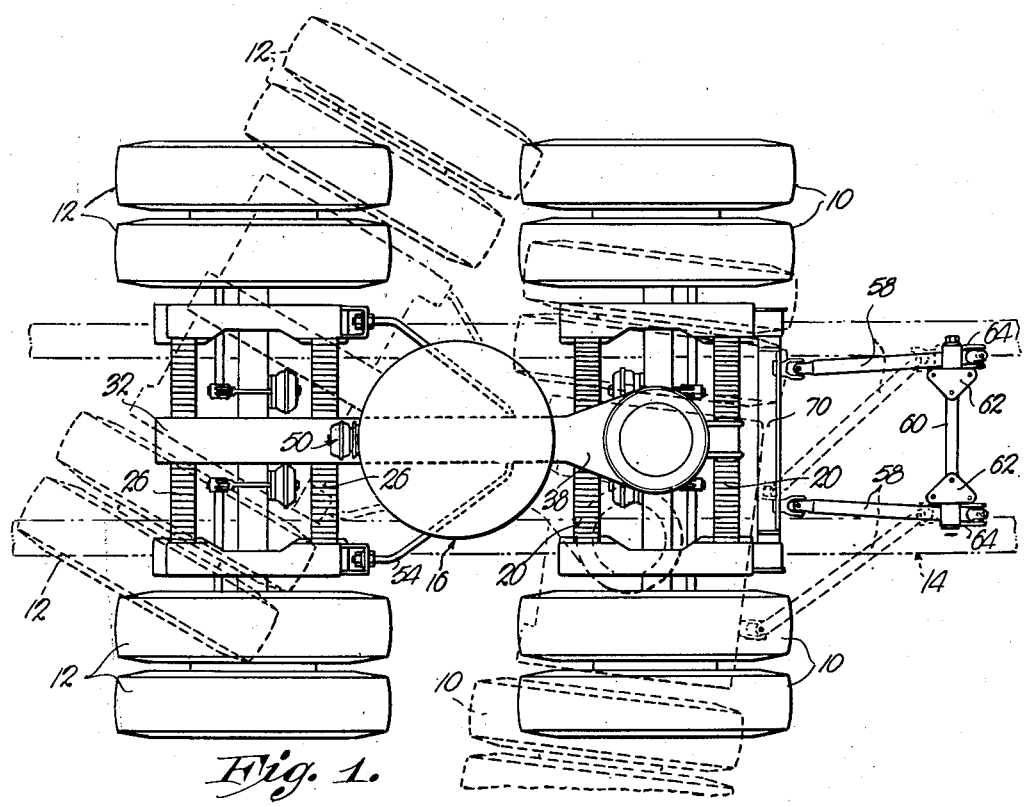
Figure 2:
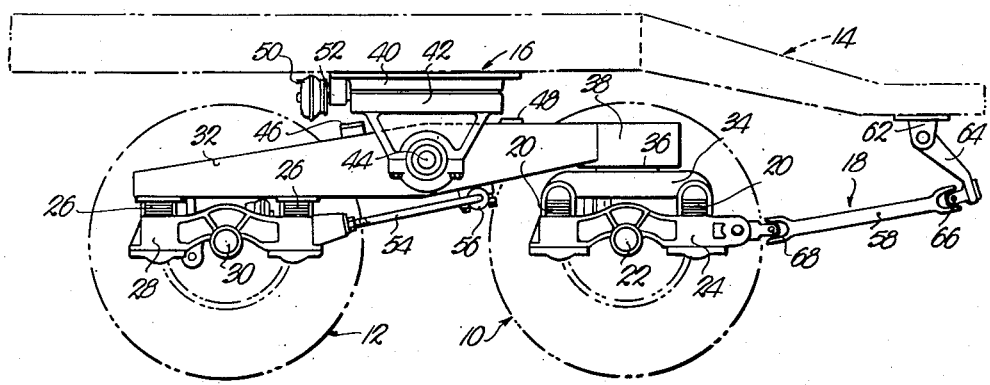

Other important objects will be made clear or become apparent as the following specification progresses, reference being had to the accompanying drawing wherein:

Figure 1 is a top plan view of a close-spaced articulating tandem made according to my present invention, illustrating by dotted lines the position thereof in a turn; and Fig. 2 is a side elevational view thereof with the proximal wheels removed.

The utilization of trailers, semi-trailers and the like in confined areas such as in and around the planes on an airport, is becoming increasingly important, necessitating therefore, the provision of running gear structure that is highly maneuverable from the standpoint of execution of sharp turns. It is necessary, therefore, in a tandem arrangement, that the wheel and axle assemblies be coupled together rather closely and that they be articulated in a manner to effect proper steering automatically during execution of turns. These desirable characteristics must be provided for without sacrificing for stabilization and equalization of loads and, as will hereinafter appear, the undercarriage shown in the drawings, is capable of fulfilling all of such requirements.

To this end, there is provided a front wheel and axle assembly 10 and a rear wheel and axle assembly 12 coupled with overlying frame 14, not only through fifth wheel structure 16, but tongue means 18.

The assembly 10 is provided with a pair of spaced, semi-elliptical, upwardly bowed leaf-spring units 20 between the wheels thereof and disposed in parallelism to axle 22 of the assembly 10. The ends of the springs 20 are joined to a pair of spaced bolsters 24 secured to the axle 22 in parallelism with the normal path of travel of the vehicle. The rear assembly 12 is likewise provided with similar springs connected to bolsters 28 rigid to rear axle 30.

The springs 20—20 and 26—26 are interconnected by a stabilizer beam 32 capable of equalizing the loads on the assemblies 10 and 12 and extending longitudinally of the running gear preferably midway between the ends of the axles 22 and 30. The beam 32 is rigidly attached to the springs 26—26 in any suitable manner not shown, and is pivotally attached at its forwardmost end to the springs 20—20 through a frame member 34 interconnecting the two springs 20 and having an upstanding trunnion 36 for rotatably receiving bearing 38 on the beam 32, whereby the assembly 10 rotates on a vertical axis through the trunnion 36 with respect to the beam 32.

The fifth wheel structure 16 includes a pair of sections 40 and 42 that are relatively rotatable on a vertical axis, the section 40 thereof being rigidly attached to the frame 14 in any suitable manner not shown. The section 42 is pivotally attached to the beam 32 intermediate the ends thereof through the medium of a horizontal stub shaft 44.

Stops 46 and 48 on the beam 32 limit the extent of swinging movement of the latter about the shaft 44 and with respect to the fifth wheel structure 16. An operator-controlled pneumatic lock unit 50, mounted on the section 40 of structure 16, is provided with a retractable pin 52 engageable with the section 42 to hold the axles 22 and 30 in parallelism when desired. The extent of relative swinging movement of the assemblies 10 and 12 may be limited in any suitable manner such as by the provision of interengaging lugs rigid to the sections 40 and 42 and not illustrated in the drawing.

The rear assembly 12 is placed in towing relationship to the beam 32 by the provision of a yoke 54 connected to the bolsters 28 and swingable vertically by virtue of a pivotal connection to the beam 32 through a bearing 56, thereby permitting the axle 30 to shift vertically with respect to the beam 32 through the springs 26.

The tongue means 18 also permits vertical movement of the axle 22 relative to the beam 32 through springs 20 and consists of a pair of tongues 58 that extend upwardly and forwardly from the assembly 10 toward the frame 14.

A transverse pintle 60 secured to the frame 14 therebeneath by attaching plates 62, receives a pair of arms 64 for swinging movement on aligned horizontal axes. The arms 64 which depend from the frame 14 are each coupled with a corresponding tongue 58 through a universal joint 66 and the tongues 58 are similarly coupled with a crossbar 70 joining bolsters 24 at the forwardmost ends of the latter through universal joints 68, it being understood that the tongues 58 are thereby permitted to swing relative to crossbar 70 and relative to the arms 64 on both horizontal and vertical axes.

It is important to note that the tongues 58 need not be in parallelism but as shown, the distance therebetween at the joints 68, may be less than the distance between the tongues 58 at the joints 66.

By virtue of the above-described construction and arrangement of parts, and particularly because of the unique tongue means 18 and the way in which the tongues 58 converge as the crossbar 70 is approached, the assemblies 10 and 12 assume the relative position illustrated by dotted lines in Fig. 1 during execution of a turn. It is seen that both axles 22 and 30 have swung clockwise, viewing Fig. 1, out of parallelism about the vertical axes of trunnion 36 and fifth wheel structure 16 respectively. However, in a maximum turn, the assembly 12 will have rotated virtually five times as far as the assembly 10. As the axles 22 and 30 assume the turning position, they diverge as the curve of the turn is approached, thereby eliminating tire scuffing.

Such desirable steering action takes place notwithstanding the extent to which the springs 20 and 26 are loaded or altered in absorbing road shocks, and notwithstanding the position of the beam 32 about the horizontal shaft 44.

Further, it is to be noted that the arms 64 are free to swing from the normal position shown in Fig. 2 extending downwardly and forwardly from the pintle 60 to a position extended downwardly and rearwardly from the pintle 60 during maximum turning.

As above indicated, the relative normal position of the arms 58 may be varied. If the distance therebetween is equal from joints 66 to joints 68, displacement of the assembly 10 laterally would result in its remaining at right angles to the longitudinal axis of the frame 14 at all times.

If however, the distance between the arms 58 is less at the joints 66 than at the joints 68, lateral displacement of axle 10 to the left would result in rotation of axle 22 in a clockwise direction about its vertical axis. In other words, the assembly 10 would turn into the curve since the axle 22 would be turning to the right at the same time that the frame 14 is turning to the right.

The third alternate is shown in the drawing and under such circumstances, when axle 22 is displaced laterally to the left, it will rotate in a counterclockwise direction about its vertical axis. Thus, the axle 22 is turning to the left while the frame 14 is turning to the right, i. e., out of the curve. While the latter form is to be preferred because of steering advantages, the relative positions of the arms 58 of tongue 18 may be varied to suit the desires of the manufacturer and needs of the user.

Having thus described the invention what is claimed as new and desired to be secured by Letters Patent is:

1. In an undercarriage for a mobile vehicle having a frame, said undercarriage including a front and a rear wheel and axle assembly; a stabilizer beam spanning the distance between the axles of said assemblies; means connecting the beam with the axle of the rear assembly; means pivotally connecting the beam with the axle of the front assembly for rotation of the latter with respect to the beam on a vertical axis; fifth wheel structure mounted on the beam and adapted to be attached to said frame for rotation of the undercarriage with respect to the frame on a vertical axis; a pair of spaced links adapted for pivotal connection to the frame in depending relationship thereto forwardly of the undercarriage to swing on horizontal axes traversing the normal path travel of the vehicle; a tongue for each link respectively pivotally interconnecting the front assembly and the links; and universal joints between the tongues and the front assembly for free swinging movement of the tongues on both horizontal and vertical axes relative to the front assembly.

2. In an undercarriage for a mobile vehicle having a frame, said undercarriage including a front and a rear wheel and axle assembly; a stabilizer beam spanning the distance between the axles of said assemblies; means connecting the beam with the axle of the rear assembly; means pivotally connecting the beam with the axle of the front assembly for rotation of the latter with respect to the beam on a vertical axis; fifth wheel structure interposed between the frame and the beam and adapted to be attached to said frame for rotation of the undercarriage with respect to the frame on a vertical axis; a pair of spaced links adapted for pivotal connection to the frame in depending relationship thereto, forwardly of the undercarriage to swing on horizontal axes traversing the normal path of travel of the vehicle; a tongue for each link respectively, pivotally interconnecting the front assembly and the links; and universal joints between the tongues and the links for free-swinging movement of the tongues on both horizontal and vertical axes relative to the frame.

3. In an undercarriage for a mobile vehicle having a frame, said undercarriage including a front and a rear wheel and axle assembly, each provided with spring means between the wheels thereof and attached to the axles thereof; a stabilizer beam spanning the distance between the axles of said assemblies; means connecting the beam with the spring means of the rear assembly; means pivotally connecting the beam with the spring means of the front assembly for rotation of the latter with respect to the beam on a vertical axis; fifth wheel structure mounted on the beam and adapted to be attached to said frame for rotation of the undercarriage with respect to the frame on a vertical axis; a pair of spaced links adapted for pivotal connection to the frame in depending relationship thereto forwardly of the undercarriage to swing on horizontal axes traversing the normal path of travel of the vehicle; a tongue for each link respectively pivotally interconnecting the front assembly and the links; and universal joints between the tongues and the front assembly and between the tongues and the links for free swinging movement of the tongues on both horizontal and vertical axes relative to the frame and the front assembly.

4. In an undercarriage for a mobile vehicle having a frame, said undercarriage including a front and a rear wheel and axle assembly, each provided with a pair of spaced bolsters rigidly secured to the axles thereof transversely of the latter and a pair of spaced leaf-spring units spanning the bolsters and attached thereto at each end of the units and at each end of the bolsters between the wheels of the assemblies in parallelism with said axles; a stabilizer beam spanning the distance between the axles of said assemblies; means connecting the beam with the spring units of the rear assembly intermediate the ends thereof; means pivotally connecting the beam with the spring units of the front assembly intermediate said ends thereof for rotation of the latter with respect to the beam on a vertical axis; fifth wheel structure mounted on the beam and adapted to be attached to said frame for rotation of the undercarriage with respect to the frame on a vertical axis; and tongue means pivotally coupled with the bolsters of the front assembly and adapted for pivotal connection with the frame, said tongue means extending forwardly and upwardly from the bolsters of the front assembly.

5. In an undercarriage for a mobile vehicle having a frame, said undercarriage including a front and a rear wheel and axle assembly, each provided with a pair of spaced bolsters rigidly secured to the axles thereof transversely of the latter and a pair of spaced leaf-spring units spanning the bolsters and attached thereto at each end of the units and at each end of the bolsters between the wheels of the assemblies in parallelism with said axles; a stabilizer beam spanning the distance between the axles of said assemblies; means connecting the beam with the spring units of the rear assembly intermediate the ends thereof; means pivotally connecting the beam with the spring units of the front assembly intermediate said ends thereof for rotation of the latter with respect to the beam on a vertical axis; fifth wheel structure mounted on the beam and adapted to be attached to said frame for rotation of the undercarriage with respect to the frame on a vertical axis; a crossbar interconnecting the bolsters of the front assembly at the forwardmost ends thereof; and a pair of spaced tongues pivotally coupled with said crossbar and adapted for pivotal connection with the frame, said tongues extending forwardly and upwardly from the crossbar.

6. In an undercarriage for a mobile vehicle having a frame, said undercarriage including a front and a rear wheel and axle assembly, each provided with a pair of spaced bolsters secured to the axles thereof and a pair of spaced leaf-spring units spanning the bolsters and attached thereto between the wheels of the assemblies in parallelism with said axles; a stabilizer beam spanning the distance between the axles of said assemblies; means connecting the beam with the spring units of the rear assembly; means pivotally connecting the beam with the spring units of the front assembly for rotation of the latter with respect to the beam on a vertical axis; fifth wheel structure mounted on the beam and adapted to be attached to said frame for rotation of the undercarriage with respect to the frame on a vertical axis; a crossbar interconnecting the bolsters of the front assembly at the forwardmost ends thereof; a pair of spaced links adapted for pivotal connection to the frame in depending relationship thereto forwardly of the undercarriage to swing on aligned horizontal axes traversing the normal path of travel of the vehicle; and a tongue for each link respectively pivotally interconnecting the crossbar and the links.

7. In an undercarriage as set forth in claim 6 wherein the distance between the tongues at the frame is greater than the distance between the tongues at the crossbar whereby, during manipulation of turns, the front assembly swings in one direction relative to the curve of the turn and the rear assembly swings in the opposite direction relative to said curve.

8. In an undercarriage as set forth in claim 7 wherein is provided universal joints between the tongues and the crossbar and between the tongues and the links for free swinging movement of the tongues on both horizontal and vertical axes relative to the frame and the front assembly.

9. In an undercarriage for a mobile vehicle having a frame, said undercarriage including a front and a rear wheel and axle assembly, each provided with a pair of spaced bolsters rigidly secured to the axles thereof transversely of the latter and a pair of spaced leaf-spring units spanning the bolsters and attached thereto at each end of the units and at each end of the bolsters between the wheels of the assemblies in parallelism with said axles; a stabilizer beam spanning the distance between the axles of said assemblies; means connecting the beam with the spring units of the rear assembly intermediate the ends thereof; means pivotally connecting the beam with the spring units of the front assembly intermediate said ends thereof for rotation of the latter with respect to the beam on a vertical axis; fifth wheel structure mounted on the beam and adapted to be attached to said frame for rotation of the undercarriage with respect to the frame on a vertical axis; means pivotally attaching said structure to the beam for swinging movement of the undercarriage with respect to the frame on a horizontal axis; a crossbar interconnecting the bolsters of the front assembly at the forwardmost ends thereof; and a pair of spaced tongues pivotally coupled with said crossbar and adapted for pivotal connection with the frame, said tongues extending forwardly and upwardly from the crossbar.

10. In an undercarriage for a mobile vehicle having a frame, said undercarriage including a front and a rear wheel and axle assembly, each provided with a pair of spaced bolsters secured to the axles thereof and a pair of spaced leaf-spring units spanning the bolsters and attached thereto between the wheels of the assemblies in parallelism with said axles; a stabilizer beam spanning the distance between the axles of said assemblies; means connecting the beam with the spring units of the rear assembly; means pivotally connecting the beam with the spring units of the front assembly for rotation of the latter with respect to the beam on a vertical axis; fifth wheel structure mounted on the beam and adapted to be attached to said frame for rotation of the undercarriage with respect to the frame on a vertical axis; means pivotally attaching said structure to the beam for swinging movement of the undercarriage with respect to the frame on a horizontal axis; a crossbar interconnecting the bolsters of the front assembly at the forwardmost ends thereof; a pair of spaced links adapted for pivotal connection to the frame in depending relationship thereto forwardly of the undercarriage to swing on aligned horizontal axes traversing the normal path of travel of the vehicle; a tongue for each link respectively; universal joints connecting the tongues with corresponding links; and universal joints connecting the tongues with the crossbar.

11. In an undercarriage as set forth in claim 10 wherein the distance between the tongues at the frame is greater than the distance between the tongues at the crossbar whereby, during manipulation of turns, the front assembly swings in one direction relative to the curve of the turn and the rear assembly swings in the opposite direction relative to said curve.

12. In an undercarriage for a mobile vehicle having a frame, said undercarriage including a front and a rear wheel and axle assembly; a stabilizer beam spanning the distance between the axles of said assemblies; means connecting the beam with the axle of the rear assembly; means pivotally connecting the beam with the axle of the front assembly for rotation of the latter with respect to the beam on a vertical axis; fifth wheel structure mounted on the beam and adapted to be attached to said frame for rotation of the undercarriage with respect to the frame on a vertical axis; a pair of spaced links adapted for pivotal connection to the frame in depending relationship thereto forwardly of the undercarriage to swing on horizontal axes traversing the normal path of travel of the vehicle; and a tongue for each link respectively pivotally interconnecting the front assembly and the links.

13. In an undercarriage as set forth in claim 12 wherein the distance between the tongues at the frame is greater than the distance between the tongues at the front assembly whereby, during manipulation of turns, the front assembly swings out of the curve of the turn and the rear assembly swings into said curve.

14. In an undercarriage for a mobile vehicle having a frame, said undercarriage including a front and a rear wheel and axle assembly; a stabilizer beam spanning the distance between the axles of said assemblies; means connecting the beam with the axle of the rear assembly; means pivotally connecting the beam with the axle of the front assembly for rotation of the latter with respect to the beam on a vertical axis; fifth wheel structure interposed between the frame and the beam and adapted to be attached to said frame for rotation of the undercarriage with respect to the frame on a vertical axis; means pivotally attaching said structure to the beam for swinging movement of the undercarriage with respect to the frame on a horizontal axis; a pair of spaced links adapted for pivotal connection to the frame in depending relationship thereto forwardly of the undercarriage to swing on horizontal axes traversing the normal path of travel of the vehicle; and a tongue for each link respectively pivotally interconnecting the front assembly and the links.

15. In an undercarriage as set forth in claim 14 wherein the distance between the tongues at the frame is greater than the distance between the tongues at the front assembly whereby, during manipulation of turns, the front assembly swings out of the curve of the turn and the rear assembly swings into said curve.

16. In an undercarriage as set forth in claim 15 wherein is provided universal joints between the tongues and the front assembly and between the tongues and the links for free swinging movement of the tongues on both horizontal and vertical axes relative to the frame and the front assembly.

References Cited in the file of this patent

UNITED STATES PATENTS

| 1,861,111 | Cason | May 31, 1932 |
| 2,466,194 | Anderson | Apr. 5, 1949 |
| 2,672,350 | Ott | Mar. 16, 1954 |